Figure 1:
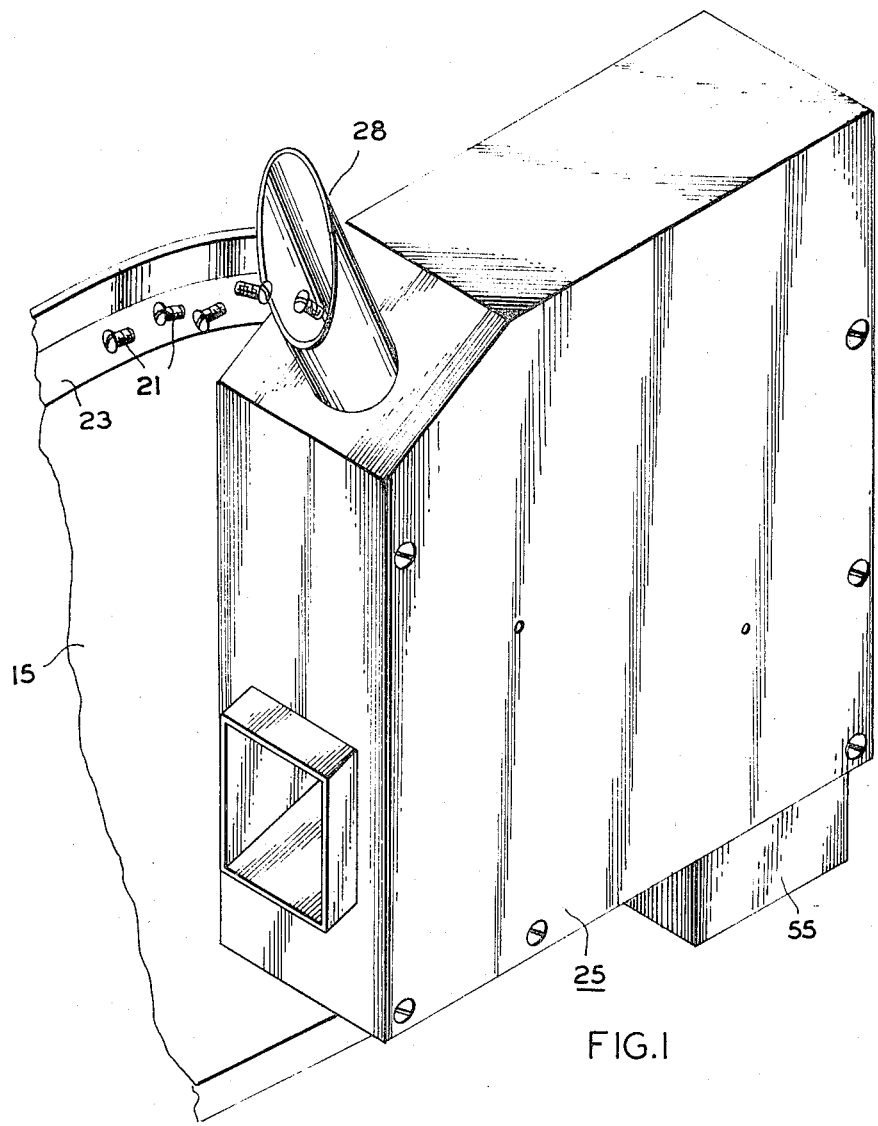

United States Patent

[11] 3,618,819

| [72] | Inventors | Charles M. Blackburn<br>Seat Pleasant;<br>John L. Ditman, Beltsville, both of Md. |
|---|---|---|
| [21] | Appl. No. | 864,426 |
| [22] | Filed | Oct. 7, 1969 |
| [45] | Patented | Nov. 9, 1971 |
| [73] | Assignee | Sigma Systems Incorporated<br>Seat Pleasant, Md. |

[54] ELECTRONIC COUNTING APPARATUS
12 Claims, 5 Drawing Figs.

[52] U.S. Cl. .................................................. 221/2,
53/59, 53/78
[51] Int. Cl. .................................................. G07f 11/00
[50] Field of Search .................................................. 221/2, 9,
10, 13, 225, 247, 248, 311; 222/318; 53/56, 58,
75, 78, 59

[56] References Cited
UNITED STATES PATENTS

| 2,515,965 | 7/1950 | Nurnberg | 53/78 X |
| 2,523,517 | 9/1950 | Potter | 53/59 X |
| 2,760,315 | 8/1956 | Wilckens et al. | 53/59 |
| 3,133,624 | 5/1964 | Craig | 53/78 X |
| 3,450,249 | 6/1969 | Poll | 53/78 X |
| 3,521,426 | 7/1970 | Evins | 53/59 |

*Primary Examiner*—Lloyd L. King
*Attorney*—Wilfred G. Caldwell

ABSTRACT: A supply unit comprising a source of parts or pieces feeds a parts-handling unit, which in cooperation with an electronic controller unit, exactly accumulates batches or lots of a predetermined number of parts. The batches are dumped into packages or bags and the counter is reset prior to the next accumulation. High speed and accurate counting are obtained by detecting parts passing to the accumulator through interruption of a broad thin area beam of light impinging on a solar cell via limit slits. The length of each output pulse is analyzed to determine if one or two parts passed and the counter is appropriately updated. Also, the feeding rate is reduced when the count approaches the predetermined number comprising a batch, and a high speed deflector moves into the parts path to the accumulator as the batch is completed to the predetermined number to deflect following parts away from the accumulator for subsequent refeeding to the parts-handling unit.

INVENTORS
CHARLES M. BLACKBURN
JOHN L. DITMAN

BY Wilfred G. Caldwell
ATTORNEY

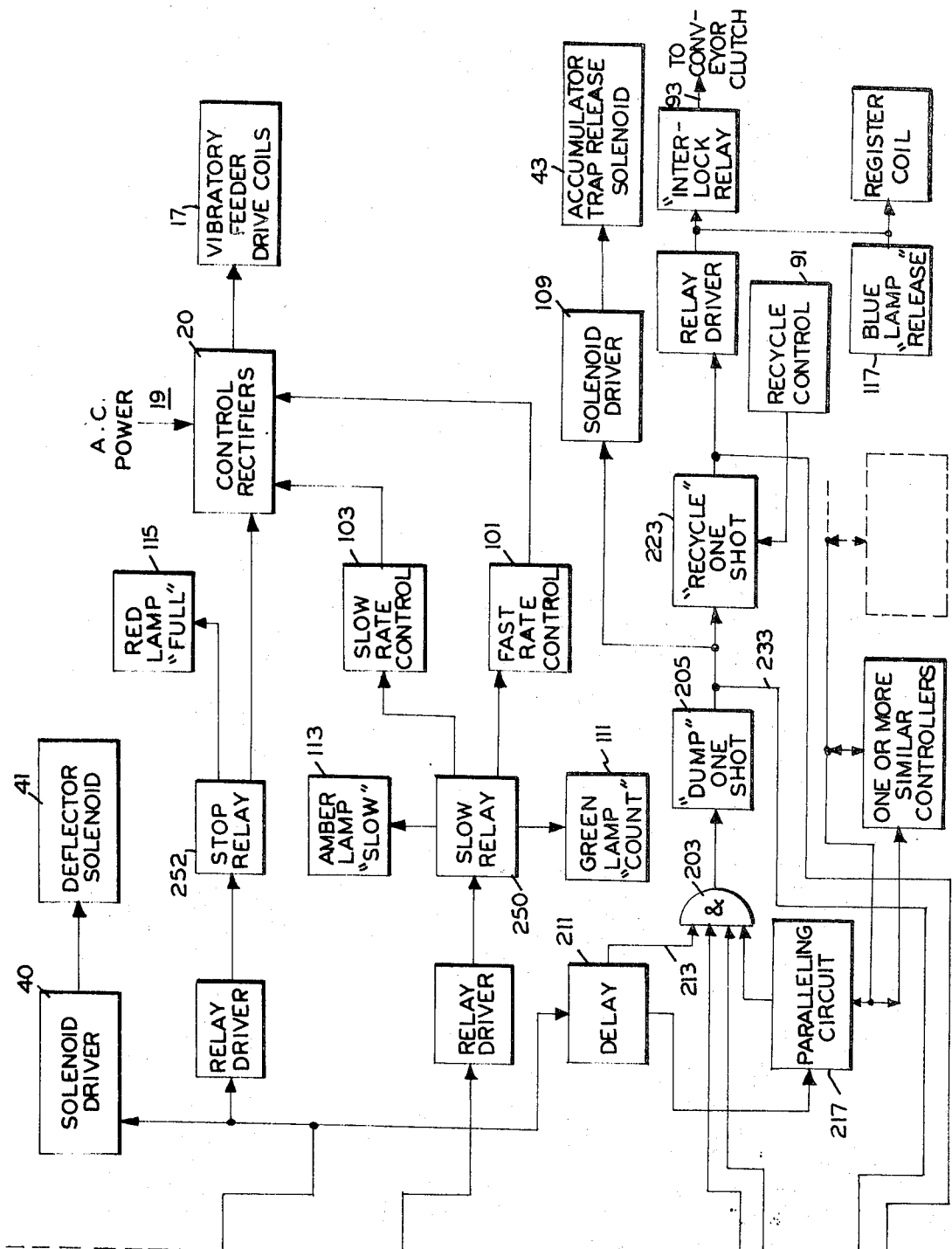

ELECTRONIC COUNTING APPARATUS

The invention while basically relating to a parts-handling unit for high speed accurate counting out of parts or pieces to comprise a lot or batch equal to a settable predetermined number, incorporates the cooperating electronic controller, supply or feeder source of the parts and bagging or boxing provisions for the batches.

In the automatic mode, all these units will corporate to convey out batches of the proper number of pieces. By way of example, the invention will feed and count in the range of 5,000 to 100,000 parts per hour with such parts comprising screws, nuts, washers, buttons, connector contacts, stampings, moldings, and a multitude of other parts of various sizes and shapes. In one model, the part may range from 1/16 of an inch in diameter to 1 inch in diameter and from ⅛ of an inch in length to 2 inches in length, and the accuracy of counting is of the order of only one error in 10,000 counts.

Various feeding arrangements may be employed to supply parts to the parts handling unit, but the well-known vibratory feeder bowl type is commonly used. An inside spiral track rises along the inner periphery of the bowl to fairly reliably feed the parts in single file into the product entrance or ingress chute of the parts-handling unit. The electronic controller unit includes number-selector switches to set the desired batch size and to select the reduce feed speed point, at which point the controller reduces the voltage to the vibratory drive coils of the feeder.

The parts entering the ingress chute are detected in free flight regardless of the shape, size or color because they interrupt a thin area light beam which is impinging upon one or more solar cells connected in parallel. Thus, regardless of the angle of entry, the part, nevertheless, interrupts the beam to reduce the amount of light falling on the solar cells and this produces a corresponding output pulse. If two relatively long parts pass the detecting station overlapping, the pulse is longer than the selected pulse length for the single pulse, and is accordingly split into two pulses for updating the counter in totaling the accumulated parts. Thus, either one or two counts are deducted from the programmed batch as one or two parts pass the detecting station.

When the reduced speed setting is reached, the feed system is automatically switched to the predetermined slower speed and continues to feed parts until the programmed lots have been counted out. While the feed system is immediately shut off, nevertheless, an extra part or two may be in free flight, and it is the purpose of a high-speed deflector to shift into a position to deflect all parts away from the accumulator which are in excess of the lot.*

* The normal use of the high (or fast) feed rate is to operate the vibratory feeder at the greatest rate at which it can deliver parts in single file one layer deep. The normal use of the slow feed rate is to space the parts in flight far enough apart for the deflector to operate after the final part has passed the light beam and to deflect the next part.

By way of example, the system may be programmed to count 100 nuts. The highest feed rate is found to be 1,500 nuts per minute. The fast feed control is set to this rate. The reduced speed rate is set for 500 nuts per minute by the slow feed control adjustment. Ten (10) is selected as a reduced speed point to give the vibratory feeder time to slow to the 500 rate. Therefore, the first 90 nuts will be counted at 1,500 nuts per minute and the last 10 at 500 per minute. Bringing the feed rate from 1,500 to 500 ensures that the deflector will not allow any extra parts to reach the accumulator.

As each part is counted, it is stored in the accumulator until the lot is completed, then automatically or by external control, the entire lot is released through a solenoid operated trap door at the bottom of the accumulator which drops the lot via an egress chute, to a bag or box for packaging or into a packaging machine conveyor bucket. The system recycles and starts to fill the accumulator while the packaging machine may be going through its cycle or the operator is closing the package and inserting an empty package. In the automatic mode of operation a time delay network cycles the system, and otherwise, the operator presses a foot switch or the like to discharge the batch, or the packaging machine closes a switch to discharge the batch the linkage mechanism from the accumulator trap release solenoid to the trap door is dead center type linkages with biasing springs, which are positive acting, but which can be quickly released with a modest force from the solenoid.

The invention is believed to reside in the parts handling unit per se, the combinations of known electronic circuitry shown in block form, and in the overall combination of the cooperating feeder, handler and controller.

With the foregoing in mind, it is among the objects of the invention to provide a high speed counting and handling system for packaging lots of predetermined numbers of parts or pieces.

Another object of the invention is to provide a high degree of speed and accuracy in the use of such a system by employing a large area thin light beam impinging upon a solar cell for selectively detecting the passage of one or more parts.

Another object is to incorporate pulse width discrimination and comparison for splitting long or wide pulses into two pulses to subtract two counts when two parts have passed the detecting station.

A further object is the provision of a parts handler unit wherein the predetermined number of parts are count accumulated along a first path, and when a batch has been accumulated, a deflector blocks the first path and ejects further parts along a second path for refeeding in subsequent lots.

A still further object is the provision of selectable controls including speed control of the feeding as to rate of feeding and number of parts to comprise a batch whereby the speed may be reduced at a predetermined point to avoid excess accumulation of parts.

Figure 2:
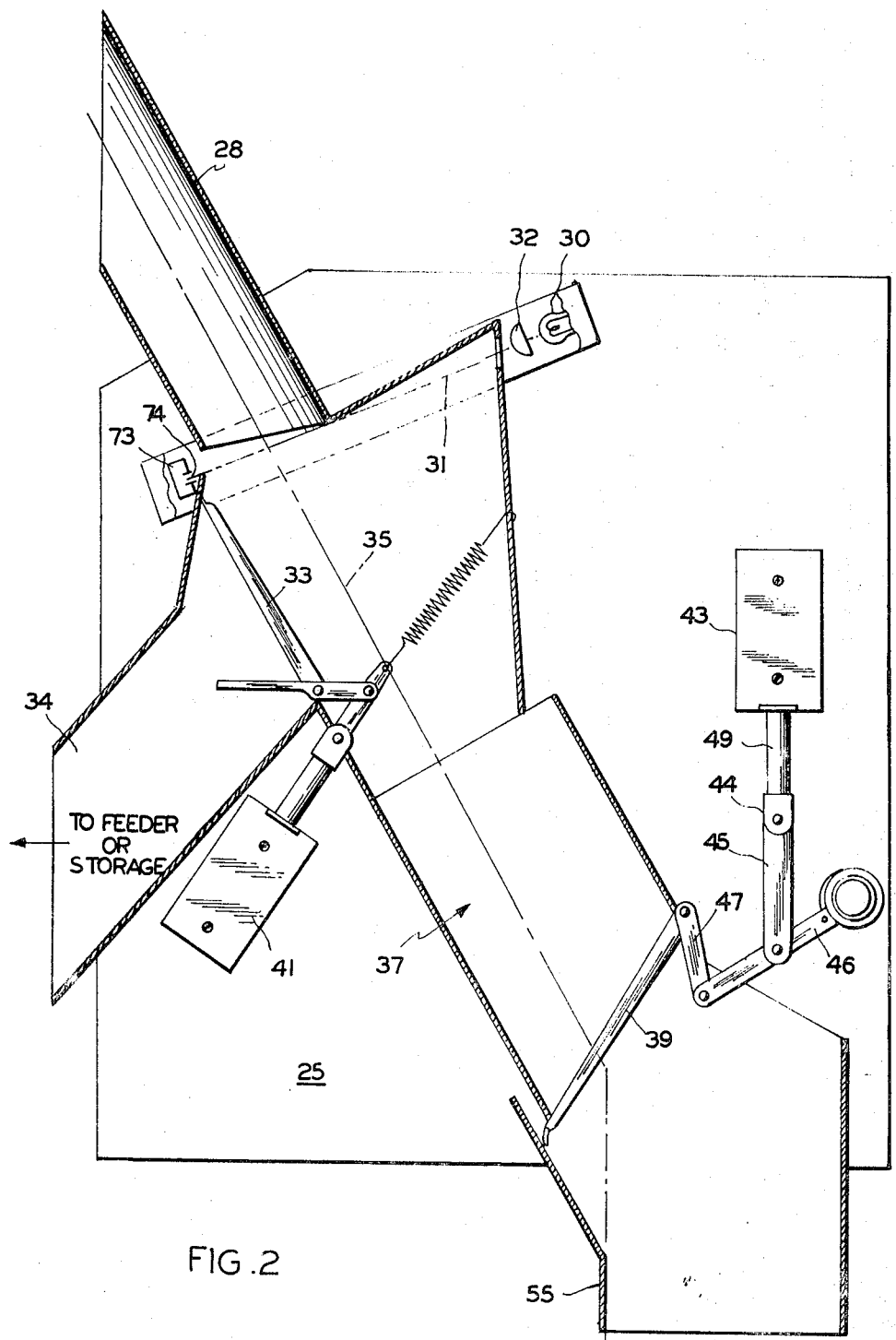
Figure 3:
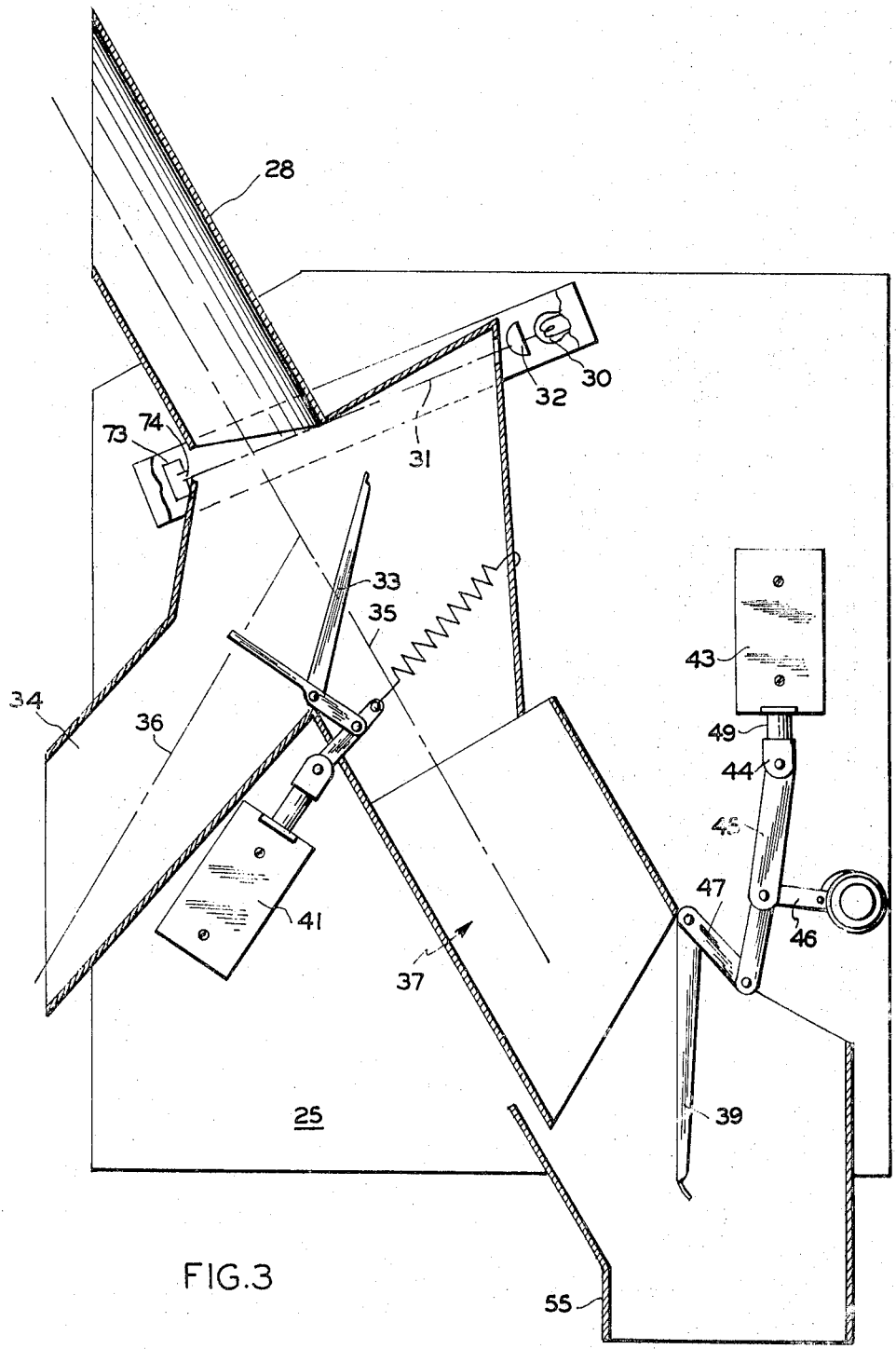
Figure 4:
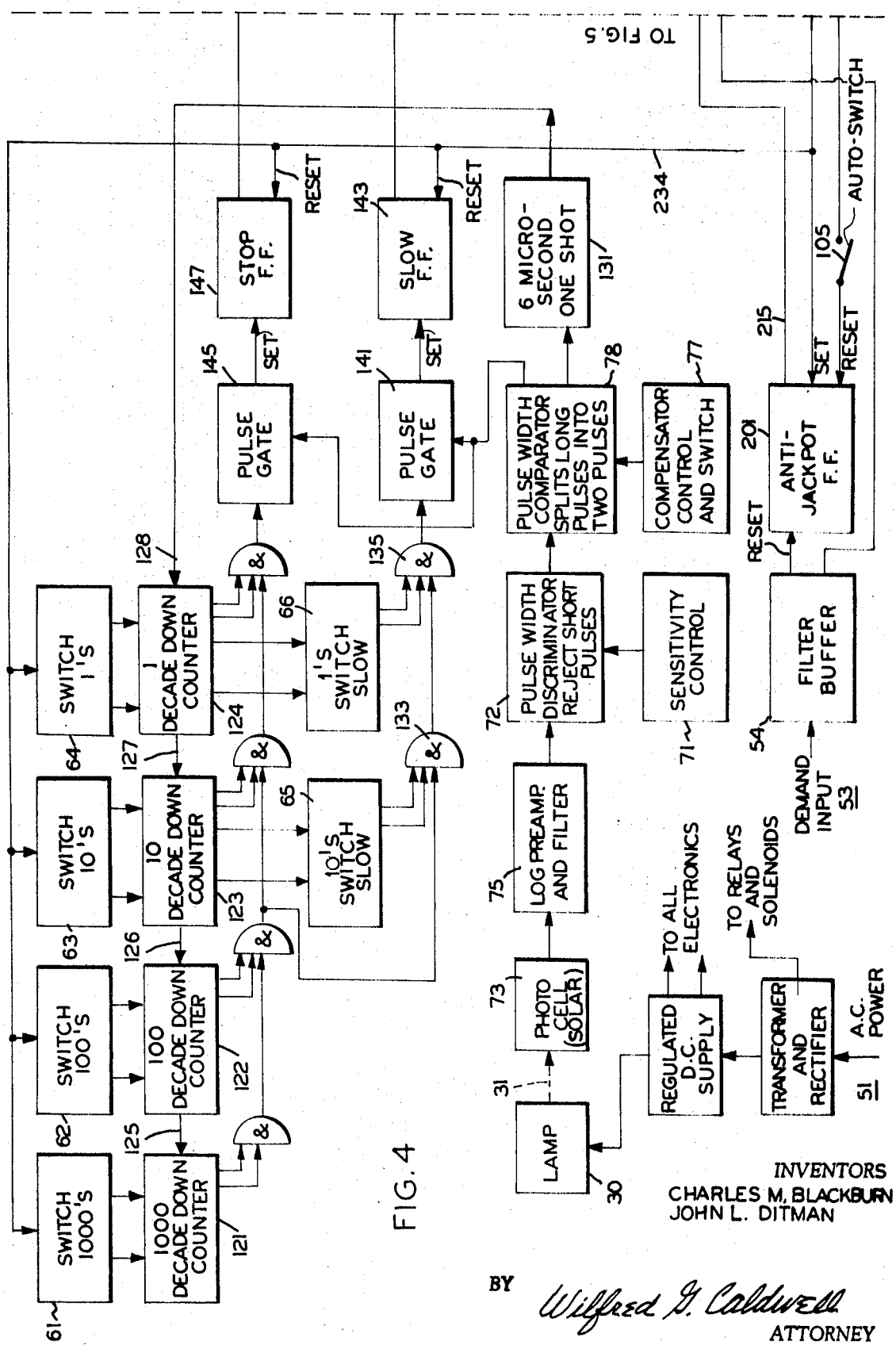

The invention will be better understood from a reading of the following detailed description thereof when taken in the light of the accompanying drawings wherein:

FIG. 1. is a view in perspective of the parts-handling unit, and also shows a broken portion of the parts-feeding unit, FIG. 2 is a view in section of the parts-handling unit of FIG. 1 in condition for accumulating a lot or batch, FIG. 3 is a view, similar to FIG. 2, but showing the lot being dumped into the packaging chute with the deflector operative to preclude further parts from entering the accumulator, and FIGS. 4 and 5 combine to show a block diagram of the electronic controller.

The present system comprises three units which will be described separately with reference to FIGS. 1–5. First of the three units is the feed or supply apparatus. This preferably consists of a vibratory bowl feeder, with appropriate bowl 15, and with electromagnetic drive coils 17 (FIG. 5). Alternating current at 19, supplied to the drive coil or coils via the control rectifiers 20 will cause the bowl to vibrate along a helix in such a manner as to cause parts or pieces 21 FIG. 1) in it to move in a circle. Around the rim of this bowl is a spiral track 23 (FIG. 1) which originates at the bottom inside (not shown) and in one or more revolutions around the bowl 15 forms a ramp which terminates at a drop off. The bottom of the bowl is raised in the center sufficient to make the parts move toward the outer edge where they will start up the spiral ramp 23. The ramp may be pitched toward the outer edge to encourage the parts to move there. Built into this track there may be one or more devices (not shown) to push some of the parts off the track so that they will fall back into the bowl and one or more areas where the width of the track may be reduced to allow other parts to fall back. The desired result is to have the parts moving in single file, one part deep, when they reach the termination of the track and drop off the end.

The second unit of the machine is the parts-handling unit 25 of FIGS. 1–3. This unit has three functions. First, it detects parts falling into it when they break a light beam 31 (FIG. 2). Second, it has a deflector 33 which can be moved into a flight path 35 of the parts to block the passage. Third, is the accumulator 37 which can be closed by a movable lower wall or trap door 39 to catch and hold the counted parts, and which can be opened to release them. The deflector 33 and accumulator trap door 39 are each operated by an electrical solenoid (shown at 41 and 43). The trap door solenoid 43 is provided with a dead center type of linkage (elements 44, 45, 46 and 47) which positively holds the door shut against a heavy load of parts but which a modest force from the solenoid 43 by way of its plunger 49 can release.

The third unit of the counting machine is the controller depicted in block shown in FIGS. 4 and 5. The controller is connected to the feed system of FIG. 1, to the handling unit (FIGS. 1–3), to a further source of electrical power 51 (FIG. 4) and to any conveyor (not shown) or manual switches to coordinate its action with a supply of empty containers for the parts. The counting machine can be operated using a human operator or using an automatic conveyor. Its basic input is a "demand" signal (demand input 53 of FIG. 4) which is to be supplied when an empty container is placed under the parts-handling unit at egress chute 55 (FIGS. 1–3) in position to receive a counted batch or lot of parts from the conveyor for counted batches or from an operator.

A detailed description of the internal parts of the controller will now be presented. Controls for the controller are as follows: the number select switches 61, 62, 63 and 64 (FIG. 4); the first four determine the number of parts counted in each batch from 1 to 9,999, including 0,000 for which the controller will count 10,000. The last two number switches 65 and 66 determine the slow feed count from 1 to 99. When set to 00, slow feed does not occur. The slow feed feature of this counting machine allows the maximum capability of the feed system to be utilized until some number of parts short of completing the batch when the feed speed is reduced so that a clean cutoff at end of count can be obtained with no extra parts in the batch. The fast feed control sets the vibration amplitude of the feed system. This is usually set to the highest setting at which the parts will maintain the required single-file feed. The slow feed control is used to set a suitable amplitude to obtain an accurate cutoff at end of the count.

A vertical feed control is sometimes provided in a controller when the feed system used has a separate coil and magnet to impart the vertical component of vibration. The vertical amplitude is not reduced by the slow feed but the rotary or "horizontal" amplitude is reduced.

The sensitivity control 71 operates on the length (sets minimum acceptable pulse length) of the pulses from the photocell 73 detector, which preferably comprises a solar cell for wide area detection. Increasing sensitivity at the pulse width discriminator with appropriate allows shorter pulses to be counted. The voltage gain of the pulse amplifier 75 is not adjustable; it is fixed to accept pulses from noise and lamp filament instability.

The compensator control 77 is used when counting relatively long parts. Long parts will be fed endwise, and it is difficult to prevent some degree of overlapping in the feeding. Since the parts fall under approximately free flight conditions, the pulse length is determined primarily by the distance from end of the bowl track, the length of the part, and the acceleration of gravity. Two parts going through the light beam 31 partly overlapping will produce an unusually long pulse. The compensator circuits including the pulse width comparator 78 measure the length of the pulses and when a long one is detected, the pulse is interrupted to produce a second pulse so the two overlapping parts produce two counts.

Recycle control 91 (FIG. 5) determines the duration of a time period following release of a counted batch. This delay may be used to initiate the following release or as a holding signal to a conveyor clutch (lead shown at 93) or the like to allow time for the released batch to fall into its container via chute 55.

For the fast position, the feed system operates at the fast rate continuously from fast rate control 101 (FIG. 5) and independent of the counting function, so that the amplitude controls and the track attachments in the bowl may be adjusted to their optimum setting. The slow position operates under the slow rate control 103 independent of the counting functions so the operator may adjust the speed to his liking. The automatic position with autoswitch 105 (FIG. 4) closed allows the counting machine to pace itself and deliver counted lots when a continuous demand is applied at 53, this action being effective at the accumulator solenoid 43 (FIG. 5) via solenoid driver 109.

There are four indicators. The green 111, amber 113 and red 115 indicate the progress of the counting of the lot. The blue indicator 117 shows the duration of the release and recycle delays.

Each of the four decade down counters 121, 122, 123 and 124 (FIG. 4) contain four flip-flops arranged to count down in straight binary coded decimal. The incoming borrow (on lines 125–128) to each decade subtracts one from the count until a condition of all zeros is reached. At zero, the next incoming borrow passes through a gate to become the outgoing borrow to the next higher decade, and also the count is changed from zero to nine. The incoming borrow to the ones decade 124 is the part pulse on lead 128 from the short 6 microsec. (approximate) one-shot 131. The outgoing borrow from the thousands decade is not used.

The slow speed number selector switches 65, 66 connect the inputs to AND-gates 133, 135 to the flip-flop sides in the ones and tens decades according to the setting. When the 1,000's and 100's are at zero and the slow speed number is reached in the tens and ones, the pulse gate 141 into the slow flip-flop 143 is opened. When all four decades are counted down to zero, the lot is complete and the pulse gate 145 to the stop flip-flop 147 is opened. These pulse gates admit the trailing edge of the part pulses so that the sequence is as follows: a part enters the light beam 31, and after a length of time set by sensitivity 71, the 6 microsec. one-shot 131 fires and the count is reduced by one. If the slow feed number then exists, the slow flip-flop 143 will be set when the part leaves the light beam, and if zero then exists, the stop flip-flop 147 will be set when the part leaves the light beam.

Next, the optical system and pulse processing circuitry will be described. The light beam 31 is provided by a small lamp 30 operating from 12 volt regulated DC supply 51. The light is collimated by a cylindrical condensing lens 32 into an approximately parallel beam in one plane, and is restricted in the other plane by a slit. At the entrance to the photocell 73 is another slit 74, so the sensitive area is broad enough to completely cover the parts passage in the handling unit, and is thin in the direction of parts travel so that entry and exit are sharply defined and sensitivity are uniform across the sensing area. The cell 73 is one or more self generating solar cells connected in parallel. The cell is connected to the emitter of a common base amplifier biased so that the cell voltage is near to zero, a short-circcuuit load. Collector load is three forward diodes which develop an approximately logarithmic voltage versus current in the current ranges involved. The next stage provides the AC coupling for the pulses, so that the sensitivity of the sensing system is essentially independent of the light level on the cell. This stage is an operational amplifier with a bypass on the feedback for high AC gain and low DC gain. The time-constant is several seconds so the pulse produced by a long thin object passing the cell will not sag enough to cause errors. This network also has a low-pass net to reject noise spikes picked up from the environment.

During the passage of a part, a capacitor is allowed to charge through the sensitivity control 71. When this capacitor comes up to 5 volts, it is clamped at this level. When the part exits from the beam, the capacitor in the sensitivity control is quickly dumped to zero volts. In the meantime, another capacitor in the compensator is allowed to charge through the compensator control 77. If this capacitor gets to 5 volts, and AC coupled circuit momentarily grounds the part pulse, which effectively creates 2 pulses from one. The output pulses from the comparator circuitry feed the 6 microsec. one-shot 131 on the leading edge and feed the stop and slow flip-flop 147, 143 on the trailing edge.

Description of the demand input 53 circuitry will now be considered. The demand input is defined as either a contact closure or a contact opening, at the pleasure of the user. The input circuit can sense either of these conditions, depending on the wiring at a terminal block. The inputs go through an interference trap, a contact bounce filter, (both in the filter buffer 54) and into the system. The absence of demand is a reset to the anitjackpot flip-flop 201. The presence of a demand is one of several inputs to an AND-gate 203 which controls release of lots through dump one-shot 205 and solenoid drive 109.

Description of the antijackpot function is now given. The function of this part of the system is to allow one lot to be released into a receiving container but to prevent more than one lot from going to the same container in error. The antijackpot flip-flop 201 is set when a lot is released and is cleared when the demand signal is removed from the controller. When the controller is operated in the auto. mode, the antijackpot flip-flop will also be cleared at the end of the recycle delay period. The recycle delay can be used by a manual operator to set up a minumum time interval for the operator to remove the full container and replace it with an empty.

Description of the lot release is next considered. The sequence of events is as follows: The last part of the lot count leaves the light beam, which causes the stop flip-flop 147 to be set. A delay period is thereby initiated by delay 211 to allow the last part to travel from its position just below the light beam 31 down into the accumulator 37. At the end of this delay, a signal appears on lead 213 which indicates presence of a full lot in the accumulator. This signal is one of four inputs to AND-gate 203. Another input to this AND-gate is the clear condition of the antijackpot flip-flop 201 on led 215 indicating the container beneath the discharge is empty. A third input to the AND-gate 203 is the demand input 53, and the fourth input is from the paralleling circuits 217, which will be described hereinafter.

When all four signals to the AND-gate are present 203, the dump one-shot 205 is triggered. The dump one-shot signal is applied to the solenoid 43 which opens the accumulator trap door 39 via the solenoid driver 109. The duration of this interval is sufficient to allow all parts in the lot to fall below the edge of that trap door. At the end of the dump interval, the recycle one-shot 223 is triggered, the stop and slow flip-flops 147, 143 are cleared; the dump one-shot signal is a DC preset signal to the counting decades over leads 233 and 234 and forces them to the selected number, and at the end of the dump, this signal is removed which allows counts to register.

The deflector action will next be described with reference to FIG. 1. At the speeds this counting machine handles parts, there will usually be one or more parts falling in the entrance or ingress chute 28 when the last part in the lot passes the detector 73. The deflector 33 is a flap valve that prevents these extra parts from entering the accumulator 37.

The deflector is located immediately below the light beam area 31, and when it is in the rest position, it forms part of the wall of the chute below the light beam. This chute defines the path 35 for counted parts. The deflector 33 is pivoted at its lower edge so that when it is actuated, the upper edge will move across the chute just below the light beam. The last counted part has just passed through the beam, and will possibly be struck by the deflector but will always fall into the accumulator 37. The next part falling down the chute toward the light beam 31 will strike the upper surface of the deflector 33 and will fall out the secondary discharge chute 34, which chute may lead to a storage bin which the operator must periodically empty back into the feeder bowl or supply bin or it may lead to a conveyor for automatic return to the feeder supply bowl 15. Chute 34 defines the noncounting path 36. The deflector is operated by the stop flip-flop 147 (FIG. 4) by means of the fast acting solenoid and driver circuit 40. The solenoids used are of 2 ohms resistance and rated 6 volts DC intermittent duty. The driver circuit discharges a large capacitor charged to approximately 22 volts into the solenoid coil (of 41) to heavily overdrive it and strongly accelerate the deflector 33. The time constant of the overdrive pulse is approximately 20 millisec. and the holding current supplied to keep the deflector operated position is about 1 amp. The solenoid drive circuit has a recharge circuit to charge the capacitor in short enough time to have a full charge for each operation of the deflector at the highest repetition rate the counting machine is capable of.

The feed rate control description will now be presented. Three different types of vibratory feeder systems can be accommodated by this system. Two of these types have a single excitation coil: the required helical motion is obtained by the mechanical configuration of the resonating mass. One type is resonant at near 60 c.p.s. and the other near 120 c.p.s. A silicon controlled rectifier is used for the 60 c.p.s. type; a bidirectional controlled switch may be used for either type by firing it on both ways or one way as required. The firing circuit uses a charging circuit and a trigger-diode: the charging resistance is the feed rate control in series with a fixed resistor to set the maximum rate. The slow feed relay 250 adds the slow feed rate control 103 resistance in series with the circuit when said relay is energized and the stop relay 252 shorts the charging circuit to stop the feed. For the 60 c.p.s. feed units, a diode clamps the firing circuit to give half-wave rectification.

The third type of feeder used is resonant near 60 c.p.s. and has a rubber spring suspension which does not constrain the vibratory motion. It is equipped with a vertical coil which forces the bowl to vibrate up and down and a pair of horizontal coils which impart a couple to cause rotary vibration. The exact same 60 c.p.s. circuit for the single coil types is used to excite the rotary or "horizontal" coils, and another firing circuit and rectifier excites the vertical coil. The stop relay 252 shorts this firing circuit also but the slow relay 250 has no effect; so that the slow feed condition reduces the rotary motion but not the vertical motion. This is the correct way to control this type feeder.

The paralleling circuit 217 is now discussed in detail. This circuit allows 2 or more counting machines to be used in unison to assemble kits of different parts or to share the counting of similar parts. The effect of the paralleling circuit is to prevent any controller from releasing until all of them have come to stop and are ready for a release. At this time a demand will cause all the counting machines to release a lot simultaneously. The paralleling is accomplished by connecting the same demand signal to all the controllers and connecting the paralleling terminals of all the controllers together. Each controller has both signaling and sensing connected to the paralleling terminal. The signaling is a transistor switch which grounds the terminal until the count is complete and then ungrounds it. A load resistor to the 12 volt supply is also connected to the paralleling terminal. When any one of the controllers is not at stop and ready, the paralleling bus will be at ground; and when all controllers are ready to release, the paralleling bus will be near 12 volts. The sensing circuit detects when the bus rises above 5 volts as proof that all controllers have ungrounded it and will then accept a demand and produce a release. The paralleling inputs have an interference rejection circuit but are not provided with a contact bounce suppressor because there are never any contacts wired in this circuit.

What is claimed is:

1. Electronic counting apparatus for accumulating batches of predetermined numbers of pieces or parts comprising in combination, a parts handling unit providing a primary path and a secondary path having a common region; ingress means communicating with the common region to receive parts; accumulator means for receiving the parts passing along the primary path; means for detecting the passage of parts from the ingress means to the accumulator means; and deflector means operative within the parts handling unit to divert parts which are in transit along the common region having entered the ingress means and are in excess of said predetermined number to the secondary path to preclude more than the predetermined number of parts from being accumulated.

2. The apparatus of claim 1 wherein the detecting means comprises light emitting and directing means, a single plane collimating lens and solar cell means for receiving light from the light-emitting means and receiving less light when a part passes through the light from the emitting means, said light emitting and directing means disposing the light beam along the common region above the deflector means such that the deflector means travels immediately below the light beam; and further comprising means to count accumulation responsive to the detecting means and to the predetermined number for moving the deflector means at the time the final part in the batch has passed completely through the beam.

3. The apparatus of claim 1 further comprising packaging egress means for communication with said primary path; and dump means for the accumulator means for releasing the accumulated batch to the packaging egress means.

4. The apparatus of claim 1 further comprising feeder means for supplying parts to the ingress means of the parts handling unit; means establishing the rate of supply of parts by the feeder means, and means for reducing the rate as the parts accumulated approach the predetermined number.

5. The apparatus of claim 1, wherein the detector means comprises settable counter means for storing the predetermined number in digital form, means responsive to the detection of parts for reducing the stored count by unity for each part passing the detector means, solar cell means and light-emitting means directing a wide thin area type light beam to the solar cell means whereby the width of output pulses from the solar cell means is greater for two parts than for one part passing through the beam, and pulse width comparator means included in the means responsive to the detector means for splitting pulses produced by two parts into two pulses.

6. Electronic counting apparatus for accumulating batches of predetermined numbers of pieces or parts comprising in combination, a parts handling unit providing at least two paths having a common region; ingress means communicating with the common region to receive parts; accumulator means for receiving the parts passing along one of the paths; means for detecting the passage of parts from the ingress means to the accumulator means; deflector means operative to divert parts entering the ingress means to the other path to preclude more than the predetermined number of parts from being accumulated; solenoid means for moving the deflector means into and out of said one path; trap door means for emptying the accumulator means; and further solenoid means for opening and closing the trap door means.

7. The apparatus of claim 6 further comprising egress means for the parts-handling unit to receive batches from the accumulator means and whereat containers for the batches are disposed, counter means for storing the predetermined number in digital form, said detecting means developing pulses for parts accumulated and applying the pulses to the counter means to reduce the stored number by one for each pulse, and said deflector solenoid being responsive to the counter means when the stored number is reduced to zero to divert parts from said one path to said other path.

8. The apparatus of claim 7 further comprising demand input switching means for operating the further solenoid means.

9. The apparatus of claim 8 wherein the detecting means comprises a light source, light-directing means, solar cell pickup means, and pulse-splitting means to insure that a single pulse is delivered to the counter means for each part accumulated.

10. The apparatus of claim 1 wherein the detecting means comprises counting means, means for generating output pulses in accordance with each passage of one or more parts by the detecting means; means for analyzing said output pulses to determine how many parts passed the detecting means for each output pulse; and means for updating the counting means the correct number of times in response to the analyzing means.

11. The counting apparatus of claim 1 further comprising feeder means for introducing said parts to the ingress means; said secondary path diverting parts in excess of said predetermined number back into the feeder means for subsequent feeding to the ingress means to comprise a closed loop system; and means for resetting the deflector means to cause the parts to follow the primary path to the accumulator means.

12. The apparatus of claim 1 wherein the deflector means comprises a movable vane situated in the common region beneath the detecting means; solenoid means for moving the vane rapidly in response to a high energy impulse to close the primary path and divert parts along the secondary path; said solenoid means being responsive to a lower current condition to maintain the position of the vane with the primary path closed; and further solenoid means for emptying the accumulator means after a batch has been accumulated.

* * * * *